Feb. 4, 1958 C. E. WILKEN 2,821,778
FIXTURE FOR ASSEMBLING BLOWER WHEELS
Filed March 7, 1957
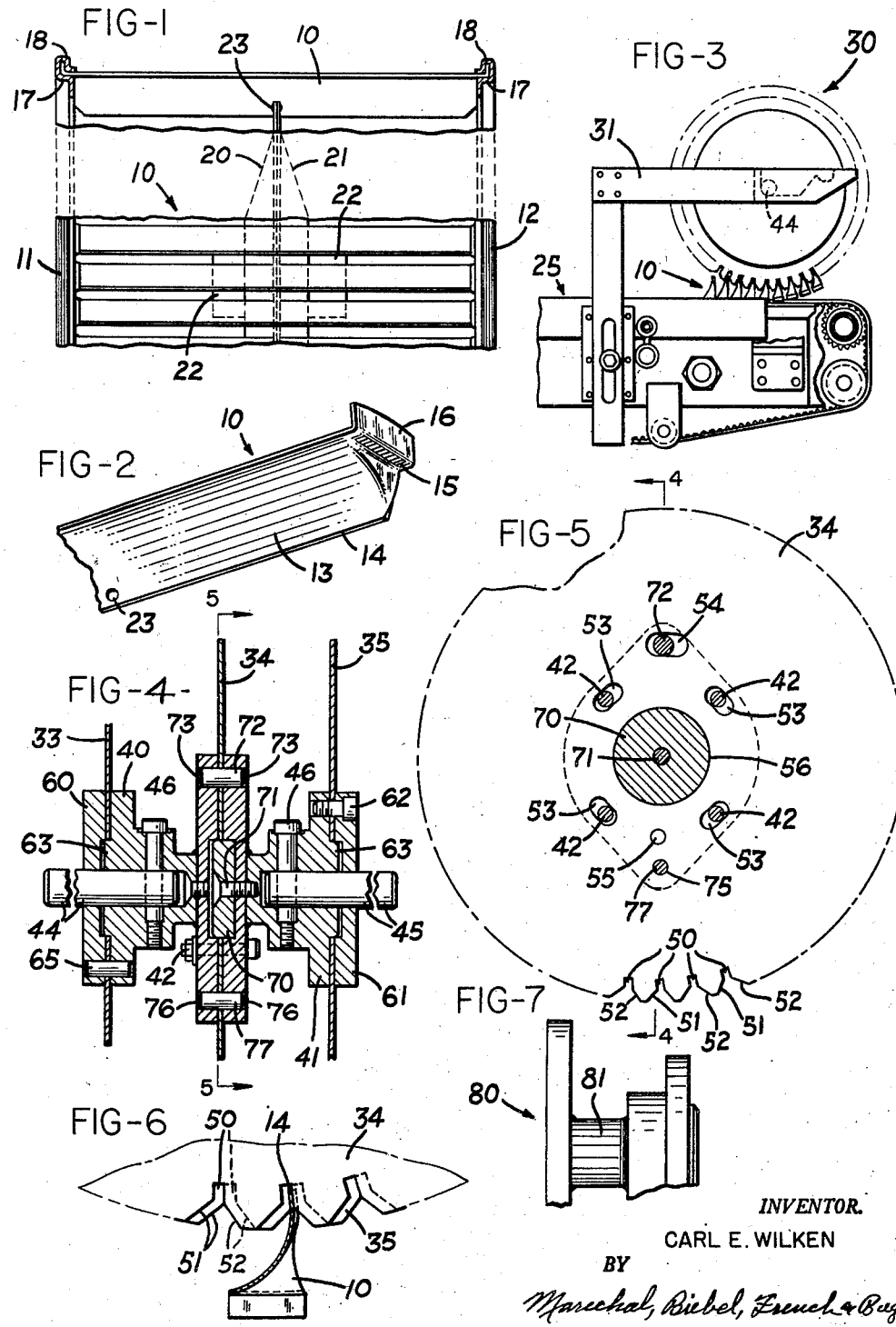
INVENTOR.
CARL E. WILKEN
BY
Marechal, Biebel, French & Bugg
ATTORNEYS

United States Patent Office 2,821,778
Patented Feb. 4, 1958

2,821,778

FIXTURE FOR ASSEMBLING BLOWER WHEELS

Carl E. Wilken, New Lebanon, Ohio, assignor to The Lau Blower Company, Dayton, Ohio, a corporation of Ohio Application March 7, 1957, Serial No. 644,621

3 Claims. (Cl. 29—286)

This invention relates to the manufacture of centrifugal blowers, and more particularly to a fixture for assembling and holding separately formed blower blades during fabrication of centrifugal blower wheels.

The invention is especially applicable to fabricating apparatus for blower wheels which includes means for delivering a plurality of separately formed blades to an assembling station in stacked relation, and the fixture of the invention has the specific purpose of assembling and holding the proper number of such blades in circumferential alignment about a central axis during the subsequent application of end rings thereto to complete the cage structure of the wheel. For example, the invention has been found useful in conjunction with the fabricating apparatus disclosed in C. E. Wilken et al. Patent No. 2,651,830 for producing blower wheels of the general type shown in Wilken Patent No. 2,537,805 and having end rings of spun construction thereon. The invention has special utility in the fabrication of blower wheels wherein the center disk of the finished wheel has portions in interlocking relation with the central part of each individual blade, as disclosed in copending Wilken application Serial No. 541,679 filed October 20, 1955 and assigned to the same assignee as this application.

It is a primary object of the present invention to provide a fixture of the above type and for the above purpose which is of outstandingly simple construction and mode of operation and which provides firm support for the assembled blades during application of end rings thereto while at the same time being quick and easy to operate both during assembly of the blades and during release therefrom of the finished cage.

Another object of the invention is to provide such a fixture which contains no parts requiring relative movement during use and which at the same time operates to grip the successive individual blades quickly and firmly during collection and assembly thereof and to hold the assembled blades securely in accurate alignment during application of end rings thereto.

It is also an object of the invention to provide a fixture of the characteristics outlined above which operates to support the individual blades both at their centers and also at positions nearer each end thereof and which is readily attached to blades of a wide range of lengths, for wheels of correspondingly different axial dimensions, with equally satisfactory results.

Additional objects and advantages of the invention will be apparent from the following description, the accompanying drawing and the appended claims.

In the drawing—

Fig. 1 is a fragmentary view partly in elevation and partly broken away in vertical section of a blower wheel of the type to which the present invention relates;

Fig. 2 is a fragmentary perspective view of one of the component blades of the wheel in Fig. 1;

Fig. 3 is a fragmentary and somewhat diagrammatic view generally in side elevation illustrating the mode of operation of the invention in the fabrication of the wheel of Fig. 1;

Fig. 4 is a view in axial section through a fixture constructed in accordance with the invention, the view being taken on the line 4—4 of Fig. 5;

Fig. 5 is a section on the line 5—5 of Fig. 4;

Fig. 6 is an enlarged view of a fragment of Fig. 5 further illustrating the operation of the invention; and Fig. 7 is a detail view showing a modified construction of the fixture of Fig. 4 for use with blades of greater length.

Referring to the drawing, which illustrates preferred embodiments of the invention, Fig. 1 shows a fragment of a blower wheel composed of a plurality of individual blades 10 arranged around the periphery of the wheel and secured together at their respective ends by a pair of end rings 11 and 12. As shown in detail in Fig. 2, each blade has a curved working face 13 having an edge 14 which lies innermost in the finished wheel. At each end, the blade is turned over at approximately right angles to form a laterally extending shoulder 15 on the convex side of the blade, and each end of the blade is turned outwardly to form a flange 16 which extends radially outwardly in the finished wheel. Each of the end rings 11 and 12 includes a shoulder portion 17 which underlies the shoulders 15 on the blades, and a flange portion 18 on each end ring is spun over the flanges 16 to secure the blades in assembled relation.

This general construction of blower wheel and a method of apparatus for fabricating the same are described in detail in the above noted patents. The blower wheel of Fig. 1 also incorporates a supporting structure which includes a pair of disk members 20 and 21 of sheet metal provided with hubs 22 by which the blower wheel is mounted on a drive shaft in use. The disks 20 and 21 include portions in their outer periphery which interlock with a hole 23 located at substantially the axial center of each blade and near its inner edge 14, as indicated at 24 in Fig. 1, this specific center disk structure being disclosed in detail in the above noted copending Wilken application.

Fig. 3 illustrates diagrammatically the initial assembly of the individual blower blades in the fabrication of the blower wheel of Fig. 1. The track indicated generally at 25 corresponds to the similar structure in Wilken et al. Patent No. 2,651,830 for receiving successive individually formed blades 10 and advancing them to an assembling station in generally stacked relation with their respective edges 14 uppermost. At this assembling station, the successive blades are picked up and held in the proper assembled relation by means of the fixture indicated generally at 30 which is constructed in accordance with the present invention. This fixture 30 is supported on a pair of bracket arms 31 mounted on opposite sides of the track in such manner that the fixture may be rotated thereon with respect to the track 25 to pick up the successive blades 10.

The structure of the fixture 30 is shown in detail in Figs. 4 and 5. It includes three disks 33, 34 and 35 mounted in axially spaced relation on a hub unit comprising two identical hubs 40 and 41 secured together by means of bolts and nuts 42. Each of these hubs 40 and 41 also carries a shaft 44 or 45 by which the complete fixture is mounted for rotation in the brackets 31 as shown in Fig. 3, the shafts being secured to the respective hubs by screws 46.

The structure of the individual disks 33—35 is shown in Fig. 5. Each of these disks has in its outer periphery a plurality of short tangential slots 50 equal in number to the number of blades in the finished wheel. The width of each of these slots is sufficiently greater than the thickness of one of the blades 10 to receive the edge 14 of a blade freely therein, and satisfactory results for the purposes of the invention have been obtained with each slot approximately .114 inch in width for blades ranging from .025 to 0.36 inch in thickness. The outer end of each of each of the slots 50 is provided at its outer end with diverging edge portions 51 and 52 which diverge at a substantial angle shown as approximately 90°. Each of the disks 33—35 is also provided with four equispaced slotted openings 53 therethrough, an additional larger through slot 54, a circular hole 55 spaced from its center, and a large center bore 56 as shown.

In the initial assembly of the fixture 30, the disks 33 and 35 are mounted on opposite ends of the hubs 40 and 41 by means of end caps 60 and 61 and screws 62 which enter the slots 53 in the respective disks, and each of the hubs is also provided with a center boss 63 on its outer end which enters the bore 56 of the adjacent disk. The disks 33 and 35 are also fixed in precise relation on the respective hubs by dowel pins 65 which enter the respective holes 55, and this arrangement secures the disks 33 and 35 in fixed relation with their respective slots 50 accurately aligned with each other.

The central disk 34 is mounted between the inner ends of the hubs 40 and 41 by means of the screws 42 in the slots 53 and a circular plug 70 which is received in the center bore 56 of the disk 34 and is secured to the hub 41 by a screw 71. A dowel pin 72 is press fitted in a pair of matching bores 73 in the hubs 40 and 41, and this dowel pin is received loosely through the slot 54 in the disk 34. The slot 54 in disks 33 and 35 is not used, nor is the hole 55 of disk 34 used, but for simplicity of manufacture this hole may be initially provided in all of the disks.

The structure described up to this point permits limited rocking movement of the central disk 34 with respect to the disks 33 and 35, to the extent allowed by the slots 53 and 54. In accordance with the invention the disk 34 is adjusted angularly to a position in which its slots 50 are offset from the associated slots in the end disks 33 and 35, and satisfactory results have been obtained with this degree of offset such that one edge of each of the slots 50 in the disk 34 is aligned with the opposite edge of each of the slots 50 in the disks 33 and 35. The disk 34 is temporarily held in this position by the clamping action of screws 42, and it is then bored at 75 in line with a pair of holes 76 in the hub members 40 and 41 to receive a press fitted dowel pin 77 to fix it in its properly adjusted position.

This offset relation of each associated set of slots 50 in the three disks is such that when a blade 10 is placed into such set of slots, it will be bowed slightly, and this creates enough tension in the blade to hold it firmly within the slots. In the use of the device as shown in Fig. 3, it is merely necessary for the operator to rotate the fixture by hand while pressing it against the upper edges of the successive blades as they advance along the track 25. The edges 51 and 52 of the respective slots 50 will act as cams to guide each blade into the proper slots and also to impart the necessary bowed shape to the blades in conformity with the offset relation of the slots. The resulting tension created in the blades has proved sufficient to cause the entire set of blades to be held firmly in the proper uniformly spaced relation while the end rings 11 and 12 are applied thereto by spinning as described in the above patents. The fixture can then be quickly and easily removed by simply forcing it axially out of the resulting completed cage unit, after which the fixture may be employed for the assembly of the blades for the next wheel while the completed cage is further processed by application of its center disk unit as described in the above Wilken application.

The invention accordingly provides a fixture having outstanding advantages for the purpose for which it is designed. Thus the component parts of the fixture are individually of simple construction and easily assembled, and since none of these parts have relative movement during use of the fixture, it is extremely simple to operate while at the same time being positive in its action. Another practical advantage is that this fixture can be located in the axial center of the cage and thereby provide a holding action on the blades which is distributed uniformly through their length, and which particularly is effective near the opposite ends of the blades and while they are attached to the respective end rings.

The fixture of the invention is not only applicable to a wide range of blade lengths for wheels of corresponding axial dimensions, in which case the only modification will be to use shafts 44 and 45 of corresponding lengths, but also it is easily adapted to production in different sizes if desired. Thus Fig. 7 shows a hub 80 which may be substituted for the hubs 40 and 41 for use in the production of wheels of greater axial length. The hub 80 is identical with the hubs 40 and 41 except in axial length, which is increased with respect to the hubs 40 and 41 by forming its shank portion 81 of greater length then the other hubs. It will be apparent, therefore, that this portion of the hub can be further lengthened if desired, and otherwise the structure and operation of the corresponding completed fixture will be the same as already described in connection with Figs. 1–6.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. A fixture of the character described for assembling and holding a predetermined number of blower blades of predetermined thickness in circumferential alignment about a central axis, comprising a center support, a pair of generally circular disks of the same diameter mounted on said center support in axially spaced relation, each said disk having in the periphery thereof a plurality of slots equal to said blade number and of slightly greater width than said blade thickness to receive the edge of one of said blades freely therein, means securing said disks to said support with said slots therein axially aligned, a third disk substantially identical to said pair of disks mounted on said support intermediate said pair of disks, means securing said third disk to said support with said slots therein angularly offset from the associated said slots in said outer disks by a predetermined small extent imparting to a blade received in said associated slots a slightly bowed shape creating tension in said blade effective to hold the same in said slots, and the outer end of each of said slots including relatively diverging cam portions having a maximum dimension circumferentially of said disks greater than said angular offset of said slots to guide each said blade into said associated slots in response to relative radial movement of disks.

2. A fixture of the character described for assembling and holding a predetermined number of blower blades of predetermined thickness in circumferential alignment about a central axis, comprising a center support, a generally circular disk secured on said center support, said disk having in the periphery thereof a plurality of slots equal to said blade number and of slightly greater width than said blade thickness to receive the edge of one of said blades freely therein, a pair of disks substantially identical to said center disk mounted on said support on either side axially of said center disk and in axially spaced relation therewith, means securing said pair of disks to said support with said slots therein aligned axially with each other and angularly offset from the associated said slots in said center disk by a predetermined small extent imparting to a blade received in said associated slots a slightly bowed shape creating tension in said blade effective to hold the same in said slots, and the outer end of each of said slots including relatively diverging cam portions having a maximum dimension circumferentially of said disks greater than said angular offset of said slots to guide each said blade into said associated slots in response to relative radial movement of disks.

3. A fixture of the character described for assembling and holding a predetermined number of blower blades of predetermined thickness and length in circumferential alignment about a central axis, comprising three generally circular disks of substantially the same diameter, each said disk having in the periphery thereof a plurality of slots equal to said blade number and of slightly greater width than said blade thickness to receive the edge of one of said blades freely therein, means supporting said disks in coaxial relation with the outer pair thereof spaced by a sufficient distance less than said blade length to receive and support said blades in said slots therein at positions located near the opposite ends of said blades, means securing said outer disks together with said slots therein axially aligned, means securing said inner disk in fixed position approximately equidistant said outer disks with said slots therein angularly offset from said slots in said outer disks by a predetermined small extent imparting to a blade received in associated slots in all of said disks a slightly bowed shape creating tension in said blade effective to hold the same in said slots, and the outer end of each of said slots including relatively diverging cam portions having a maximum dimension circumferentially of said disks greater than said angular offset of said slots to guide each said blade into said associated slots in response to relative radial movement of disks.

References Cited in the file of this patent

UNITED STATES PATENTS

| | | |
|---|---|---|
| 2,155,264 | Freed | Apr. 18, 1939 |
| 2,537,805 | Wilken | Jan. 9, 1951 |
| 2,651,837 | Wilken et al. | Sept. 15, 1953 |